US009566681B2

(12) United States Patent
Kawano

(10) Patent No.: US 9,566,681 B2
(45) Date of Patent: Feb. 14, 2017

(54) COOLANT SUPPLY DEVICE AND SUPPLY METHOD

(75) Inventor: Yuji Kawano, Kumagaya (JP)

(73) Assignee: NIPPON OIL PUMP CO., LTD., Kumagaya-shi (JP)

(*) Notice: Subject to any disclaimer, the term of this patent is extended or adjusted under 35 U.S.C. 154(b) by 276 days.

(21) Appl. No.: 14/353,371

(22) PCT Filed: Oct. 31, 2011

(86) PCT No.: PCT/JP2011/075038
§ 371 (c)(1),
(2), (4) Date: Apr. 22, 2014

(87) PCT Pub. No.: WO2013/065097
PCT Pub. Date: May 10, 2013

(65) Prior Publication Data
US 2014/0284041 A1 Sep. 25, 2014

(51) Int. Cl.
B23Q 11/12 (2006.01)
F04B 49/06 (2006.01)
F04C 14/08 (2006.01)
B23Q 11/10 (2006.01)
F04C 2/10 (2006.01)

(52) U.S. Cl.
CPC ......... B23Q 11/126 (2013.01); B23Q 11/1015 (2013.01); B23Q 11/1038 (2013.01); F04B 49/065 (2013.01); F04C 14/08 (2013.01); F04B 2203/0209 (2013.01); F04B 2205/05 (2013.01); F04C 2/10 (2013.01); F04C 2270/18 (2013.01)

(58) Field of Classification Search
None
See application file for complete search history.

(56) References Cited

U.S. PATENT DOCUMENTS 5,951,216 A * 9/1999 Antoun .............. B23Q 11/1038
405/61
2003/0147708 A1 8/2003 Cook et al.

FOREIGN PATENT DOCUMENTS

| DE | 102006052602 A1 | 4/2008 |
| JP | 2004-36421 A1 | 2/2004 |
| JP | 2004-306230 A1 | 11/2004 |
| JP | 2004-338016 A1 | 12/2004 |
| WO | 99/15298 A1 | 4/1999 |

OTHER PUBLICATIONS

International Search Report for International Application No. PCT/JP2011/075038 dated Dec. 13, 2011.
Supplementary European Search Report of May 6, 2015 for the European patent application No. 11874906.8.

* cited by examiner

Primary Examiner — Mohammad Ali
Assistant Examiner — Saad M Kabir
(74) Attorney, Agent, or Firm — Kratz, Quintos & Hanson, LLP

(57) ABSTRACT

A coolant supply device and supply method that can appropriately control the spraying of coolant using a single parameter. A pump (101) supplies coolant to a tool (D), and a measurement device (22) measures the discharge pressure of the pump (101). A control device (50) has a function for determining, from the rotation rate of the pump (101), the coolant flow path diameter for the tool (D) and the target value for the pump discharge pressure (target pressure) when the tool (D) is drilling.

2 Claims, 8 Drawing Sheets

COOLANT SUPPLY DEVICE AND SUPPLY METHOD

TECHNICAL FIELD

The present invention relates to a technique of supplying a coolant to a machine tool, in particular, a cutting tool with an oil hole such as a drill of the center-through (spindle-through) coolant type.

BACKGROUND ART

In a machining center of the center-through (spindle-through) coolant type shown in FIG. 9, a machining center 200 includes a processing table 205, a main shaft 210, a tool 220, and a coolant nozzle 240. To the processing table 205, a work 400 which is an object to be worked on is fixed. A coolant pump 100 shown in FIG. 9 is the type of pump that discharges a low-pressure coolant and a high-pressure coolant from one pump.

A high-pressure line Lh of the coolant pump 100 communicates with the tool 220, and a low-pressure line Ll of the coolant pump 100 communicates with the coolant nozzle 240.

The coolant pump 100 is attached to a coolant storage tank 300.

In the machining center 200 shown in FIG. 9, the low-pressure coolant discharged from the coolant pump 100 is supplied to the nozzle 240 and is jetted out of the nozzle 240 to the whole of the work 400. The coolant jetted out of the nozzle 240 to the whole of the work 400 removes chips during processing.

On the other hand, the high-pressure and clean coolant discharged from the coolant pump 100 is jetted from the tip of the tool 220. By jetting the coolant from the tip of the tool 220 at high pressure, cutting pieces are prevented from getting into the work 400, for example, whereby processing accuracy is improved.

The tool 220 for a high-pressure coolant shown in FIG. 9 sprays a coolant on the work to be worked on by making the high-pressure coolant flow through a coolant flow path passing through the center of the tool, and is a machine tool of the so-called "center-through coolant type.

In such a center-through coolant machine tool as shown in FIG. 9, it is important to control the spraying of the coolant appropriately to perform machining accurately.

A technique of performing control by which so-called constant-horsepower operation is performed in such a way that the product of the pressure and the flow rate of a coolant becomes nearly constant can be proposed (refer to, for example Patent Literature 1).

However, in the control by which so-called constant-horsepower operation that makes the product of the pressure and the flow rate of a coolant nearly constant is performed, since there are two types of parameters to be controlled: a pressure and a flow rate, the control itself becomes complicated, which complicates a control system.

CITATION LIST

Patent Literature 1: Japanese Patent Gazette No. 4250999

SUMMARY OF INVENTION

Problem to be Solved by the Invention

The present invention has been proposed in view of the problems of the prior art described above, and an object thereof is to provide a coolant supply device and supply method that can appropriately control the spraying of a coolant by using only a single parameter.

Solution to Problem

A coolant supply device (500) of the present invention includes a pump (for example, a gear pump 101) that supplies a coolant to a tool (D: for example, a center-through coolant drill), a measurement device (a pump discharge pressure measurement device 22) that measures a discharge pressure of the pump (101), and a control device (a control unit 50), and the control device (50) has the function of determining, from a rotation rate (a temporary rotation rate in step S5) of the pump (101), a coolant flow path diameter of the tool and a target value (a target pressure) of a pump discharge pressure at the time of boring performed by the tool (D), the function of increasing or decreasing the rotation rate of the pump (101) (or the rotation rate of an electric motor 1) by comparing the target value (the target pressure) with a measured pump discharge pressure, and the function of determining whether or not boring by the tool (D) is completed based on the measured pump discharge pressure.

In the coolant supply device (500) of the present invention, it is preferable that the control device (50) has the function of determining, after no-load running (unloading operation) of the tool (D) is ended, at a stage prior to boring performed on a work by the tool (D), a coolant flow path diameter of the tool and a target value (a target pressure) of a pump discharge pressure at the time of boring performed by the tool (D).

A coolant supply method of the present invention is directed to a method for supplying a coolant to a tool (D: for example, a center-through coolant drill) by a coolant supply device (500) provided with a pump (for example, a gear pump 101), a measurement device (a pump discharge pressure measurement device 22) that measures a discharge pressure of the pump (101), and a control device (a control unit 50), wherein a coolant flow path diameter of the tool (D) and a target value (a target pressure) of a pump discharge pressure at the time of boring performed by the tool (D) are determined from a rotation rate (a temporary rotation rate in step S5) of the pump (101), a pump discharge pressure is measured, the rotation rate of the pump (101) (or the rotation rate of an electric motor 1) is increased or decreased by comparing the target value (the target pressure) with the measured pump discharge pressure, and a determination is made as to whether or not boring by the tool (D) is completed based on the measured pump discharge pressure.

In the coolant supply method of the present invention, it is preferable that, after no-load running (unloading operation) of the tool (D) is ended, at a stage prior to boring performed on a work by the tool (D), a coolant flow path diameter of the tool (D) and a target value (a target pressure) of a pump discharge pressure at the time of boring performed by the tool (D) are determined.

Advantageous Effects of Invention

According to the present invention provided with the structure described above, since the pump discharge pressure is controlled (for example, the rotation rate of the pump 101 or the rotation rate of the electric motor 1 is increased or decreased) by comparing the target value (the target pressure) with the measured pump discharge pressure, only the discharge pressure of the pump (101) is a control parameter, and there is no need to perform feedback control of the rotation rate of the pump (101) (or the electric motor 1).

That is, according to the present invention, there is no need to perform complicated rotation rate feedback control of the pump (101) (or the electric motor 1), and it is possible to supply a coolant appropriately to the tool (D) by controlling only the discharge pressure of the pump (101).

Moreover, according to the present invention, it is possible to determine the coolant flow path diameter of the tool (D) and an optimum pump discharge pressure (target pressure) for the coolant flow path diameter independently on the pump (101) side without inputting, to the pump (101) side, information from the tool (D) such as a center-through coolant drill, for example, information on a coolant flow path diameter in the set tool (D).

As is obvious to the skilled in the art, it is very difficult to determine, on the pump (101) side, a target pressure automatically in response to a coolant flow path diameter when the coolant flow path diameter of the tool (D) such as a center-through coolant drill is determined. This is because there are an infinite number of combinations of the tool (D) and the pump (101) and the coolant flow path diameter of the tool (D) also varies widely.

On the other hand, according to the present invention, it is possible to determine the coolant flow path diameter of the tool (D) and the target pressure independently on the pump (101) side without inputting, to the pump (101) side, information on the coolant flow path diameter of the tool (D) such as a center-through coolant drill.

As a result, even when there are an infinite number of combinations of the tool (D) and the pump (101) and the coolant hole diameter of the tool (D) varies widely, it is possible to determine a coolant hole diameter of the tool (D) on the pump side that supplies a coolant, determine an optimum coolant discharge pressure for the coolant hole diameter, and perform boring by the tool (D) appropriately.

DESCRIPTION OF EMBODIMENTS

Hereinafter, with reference to the attached drawings, an embodiment of the present invention will be described.

Figure 1:
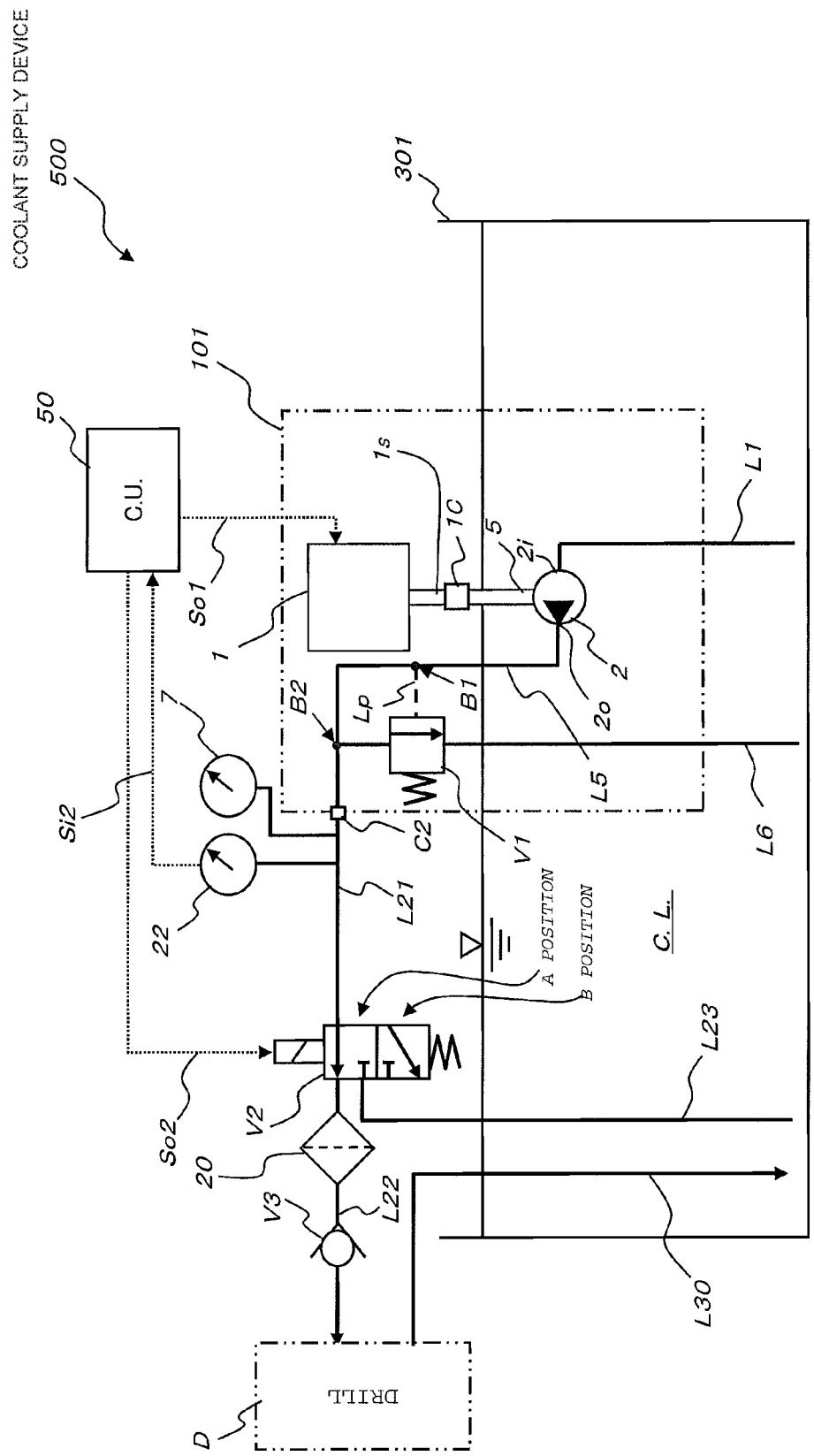
FIG. 1 is a block diagram showing an embodiment of the present invention.

In FIG. 1, the whole of a coolant supply device according to the embodiment of the present invention is identified with a numeral 500.

In addition, the coolant supply device 500 includes a pump for a coolant (for example, a gear pump) 101, a flow path change-over valve V2 (of the 3-port 2-position type, for example), a coolant storage tank 301, and a control device 50.

The pump 101 for a coolant includes an electric motor (for example, a brushless motor) 1, a high pressure generating section (a high-pressure pump) 2, and a safety valve V1.

In the pump 101 for a coolant shown in FIG. 1, the high pressure generating section 2 is driven and rotated by a pump drive shaft 5. The pump drive shaft 5 is connected to a rotating shaft 1s of the electric motor 1 by a coupling 1C.

Though not shown in the drawing, it is also possible to omit the pump drive shaft 5 and the coupling 1C and drive and rotate the high pressure generating section 2 directly by the rotating shaft 1s of the electric motor 1.

In the embodiment shown in the drawing, to vary the discharge pressure of the pump 101, the rotation rate of the pump 101 or the electric motor 1 (the rotation rate of the high-pressure pump 2) is increased or decreased.

However, in the embodiment shown in the drawing, rotation rate feedback control of the pump 101, rotation rate feedback control of the high-pressure pump 2, or rotation rate feedback control of the electric motor 1 is not performed.

To a suction port 2i of the high pressure generating section 2, a line L1 is connected. The line L1 is opened in the coolant storage tank 301 and functions as a coolant suction line.

A discharge port 2o through which a coolant is discharged from the high pressure generating section 2 communicates with a second connecting port C2 via a line L5.

In the line L5, a first branch point B1 is provided in an area on the side where the high pressure generating section 2 is located, and a second branch point B2 is provided in an area on the side where the second connecting port C2 is located. A pilot line Lp branches off from the first branch point B1 and supplies the line pressure inside the pump 101 for a coolant to the safety valve V1 as a pilot pressure.

A line L6 with the safety valve V1 disposed thereon branches off from the second branch point B2, and the line L6 is opened in the coolant storage tank 301. If the pressure of the line L5 (the discharge pressure of the high pressure generating section 2) increases above a predetermined pressure, the safety valve V1 is opened to release the pressure of the line L5 into the coolant storage tank 301, whereby the safety of the pump 101 for a coolant is ensured.

The line L5 communicates with a line L21 at the second connecting port C2. On the line L21, a visual identification pressure gauge 7 is disposed for visually identifying the pressure of the coolant flowing through the line L5. Here, the visual identification pressure gauge 7 is not included in the pump 101 for a coolant.

The line L21 communicates with the flow path change-over valve V2.

On the line L21, in an area between the visual identification pressure gauge 7 and the flow path change-over valve V2, a pump discharge pressure measurement device (hereinafter referred to as a "discharge pressure gauge") 22 that measures the discharge pressure of the pump 101 for a coolant (the high-pressure pump 2) is disposed. The measurement result of the discharge pressure gauge 22 is sent to the control device 50 via an input signal line Si2.

The discharge side (the left side in FIG. 1) of the flow path change-over valve V2 and a drill D (a tool) are connected to each other by a line L22. On the line L22, a line filter 20 and a check valve V3 are disposed.

The check valve V3 allows the coolant to flow to the drill D side from the flow path change-over valve V2, but does not allow the coolant to flow in an opposite direction (a direction from the drill D side to the flow path change-over valve V2).

The flow path change-over valve V2 receives a control signal from the control device 50 via a control signal line So2.

To the flow path change-over valve V2, a coolant return line L23 is connected, and the other end of the coolant return line L23 is opened near the bottom of the coolant storage tank 301.

One end of a coolant recovery line L30 is connected to the drill D (the tool) and recovers the coolant after cutting by the coolant recovery line L30. The other end of the coolant recovery line L30 is opened near the bottom of the coolant storage tank 301.

It is very difficult to determine a target pressure automatically on the pump 101 side when a coolant flow path diameter in the drill D is set.

The reason is that there are an infinite number of combinations of the drill D and the pump 101 and the diameter of the coolant flow path formed in the drill D also varies widely. Moreover, the reason is that the characteristics of the drill D and the characteristics of the pump 101 can vary on a case-by-case basis based on use conditions, installation conditions, and other various parameters.

On the other hand, the coolant supply device 500 according to the embodiment shown in the drawing has the function of determining, on the pump 101 side, a coolant flow path diameter formed in the drill D and an optimum pump discharge pressure (target pressure) for the flow path diameter based on a parameter on the pump 101 side.

With the coolant supply device 500 according to the embodiment shown in the drawing, when the drill D and the pump 101 are set and combined for the first time, by obtaining various characteristics which will be illustrated in FIGS. 5 to 8, in such a mode as will be described below, the coolant flow path diameter of the drill D and a target pressure are determined independently on the pump 101 side without an input of information on the coolant flow path diameter of the set drill D to the pump 101 side.

The control device 50 having the function of performing control that determines the coolant flow path diameter of the drill D and a target pressure will be described with reference to FIG. 2 which is a functional block diagram.

Figure 2:
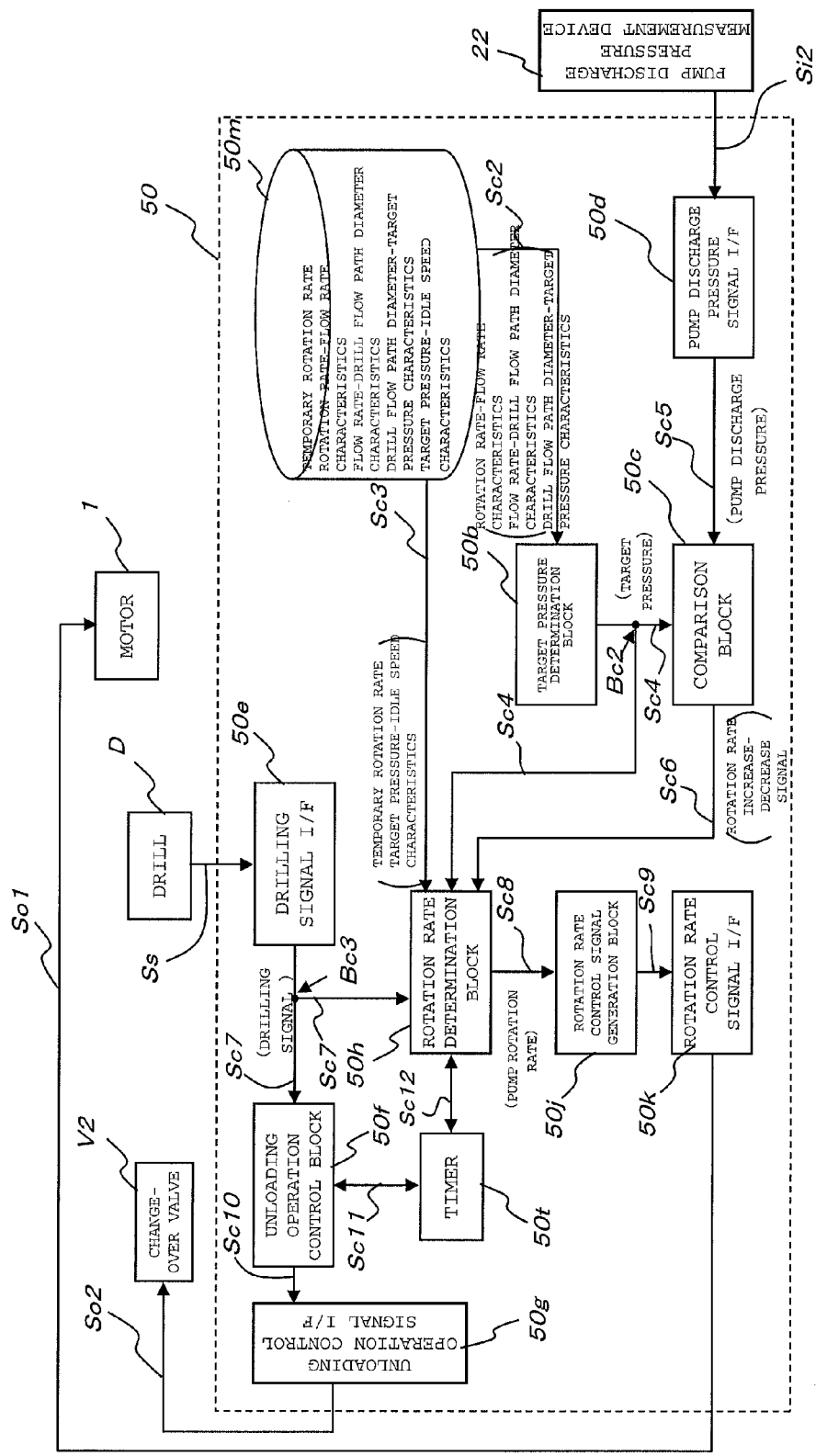
FIG. 2 is a functional block diagram of a control unit in the embodiment.

In FIG. 2, the control device 50 includes a storage device 50m, a target pressure determination block 50b, a comparison block 50c, a pump discharge pressure signal interface 50d, a drilling signal interface 50e, an unloading operation control block 50f, an unloading operation control signal interface 50g, a timer 50t, a rotation rate determination block 50h, a rotation rate control signal generation block 50j, and a rotation rate control signal interface 50k.

The storage device 50m stores a temporary rotation rate, rotation rate-flow rate characteristics, flow rate-drill flow path diameter characteristics (flow rate-coolant flow path diameter characteristics), drill flow path diameter-target pressure characteristics (coolant flow path diameter-target pressure characteristics), and target pressure-idle speed characteristics. The information stored in the storage device 50m is indispensable when the embodiment shown in the drawing performs control.

The "temporary rotation rate" stored in the storage device 50m is the rotation rate of the motor 1 (the rotation rate of the pump 101 for a coolant or the high pressure generating section 2), is a rotation rate (for example, 1000 rpm) at which a rotation rate should be stabilized when the pump 101 for a coolant is started before a work is worked on, and is a set rotation rate.

Figure 3:
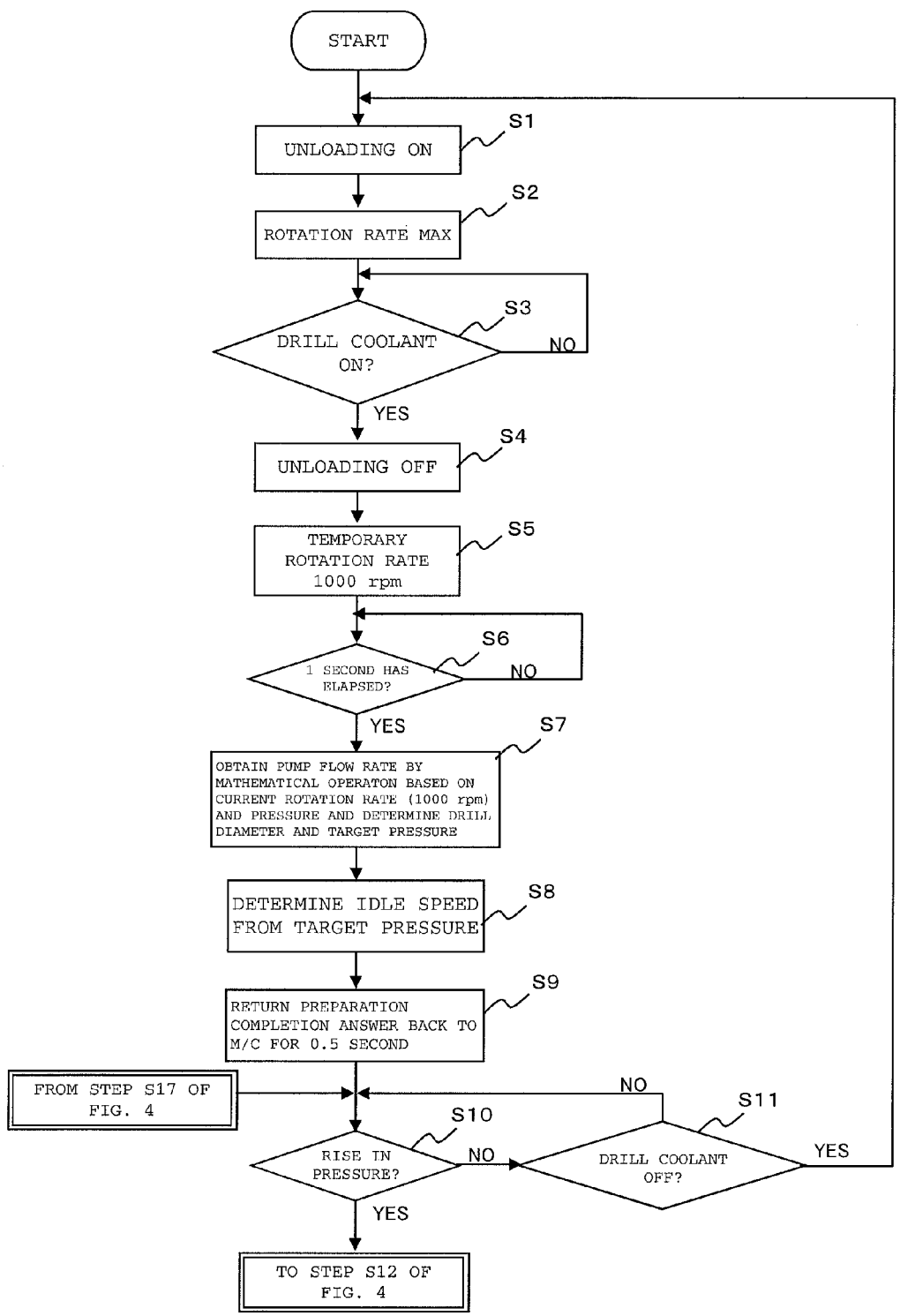
FIG. 3 is a flowchart showing a coolant spraying control in the embodiment.
Figure 5:
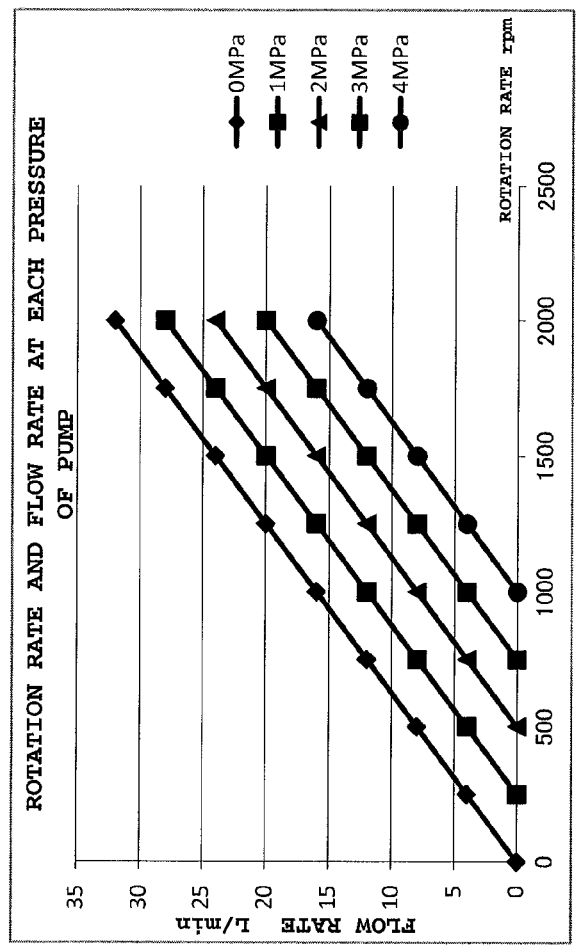
FIG. 5 is a characteristic diagram showing an example of the characteristics of the amount of rotation and the coolant flow rate of a pump.

The rotation rate-flow rate characteristics indicate the relationship between the rotation rate of the coolant pump 101 (the set rotation rate: the temporary rotation rate in step S5 in FIG. 3) and the discharge flow rate of the pump for each pressure and are characteristics shown in FIG. 5, for example. In FIG. 5, the rotation rate-flow rate characteristics when the discharge pressure Pc of the coolant pump 101 is 0 to 4 Mp are illustrated. Incidentally, in FIG. 5, the vertical axis represents a flow rate and the horizontal axis represents a rotation rate (the set rotation rate: the temporary rotation rate in step S5 in FIG. 3).

Figure 6:
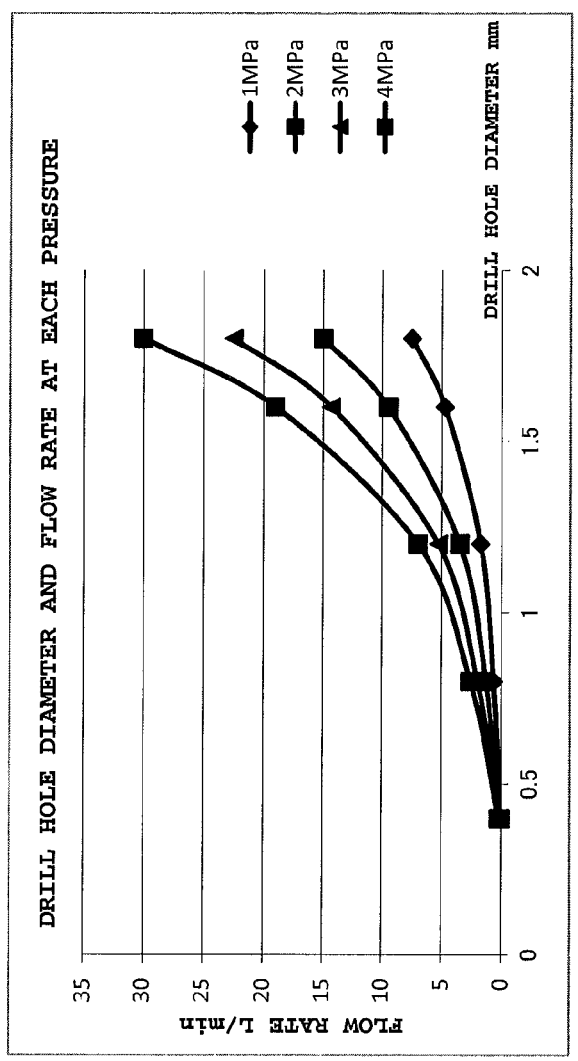
FIG. 6 is a characteristic diagram showing an example of the characteristics of a coolant flow rate and the inside diameter of a coolant flow path of a drill.

The flow rate-drill flow path diameter characteristics indicate the relationship between the flow rate that is supplied to the drill and the inside diameter size (the coolant flow path diameter) of the coolant flow path formed in the drill and are illustrated in a characteristic diagram in FIG. 6. Also in the flow rate-drill flow path diameter characteristics illustrated in FIG. 6, the discharge pressure of the coolant pump 101 is used as a parameter (Pc is 0 Mp and 1 to 4 Mp). Incidentally, in FIG. 6, the vertical axis represents a flow rate and the horizontal axis represents the flow path diameter of the drill ("drill hole diameter" in FIG. 6).

Figure 7:
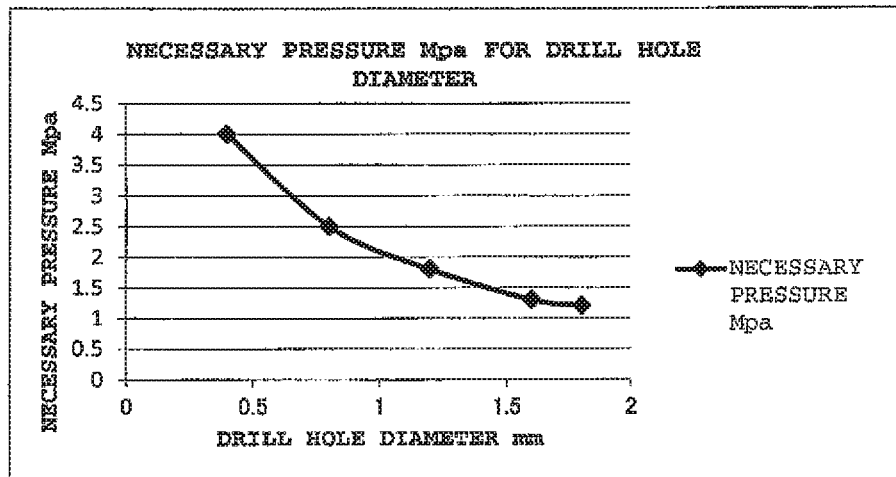
FIG. 7 is a characteristic diagram showing an example of the characteristics of the inside diameter of the coolant flow path of the drill and a target pressure.

The drill flow path diameter-target pressure characteristics indicate the relationship between a coolant flow path diameter formed in the drill and a target pressure of a coolant to be supplied (the target discharge pressure of the pump 101) and are illustrated in FIG. 7. Incidentally, in FIG. 7, the vertical axis represents a target pressure ("necessary pressure" in FIG. 7) and the horizontal axis represents the flow path diameter of the drill ("drill hole diameter" in FIG. 7).

When the drill flow path diameter (the coolant flow path diameter in the drill) is assumed to be $\phi$ and the target pressure is assumed to be Pca, the drill flow path diameter-target pressure characteristics can be expressed by the following expression, for example.

$$Pca = k \cdot 1/\phi^\epsilon \text{ (}k \text{ and } \epsilon \text{ are constants)}$$

Figure 8:
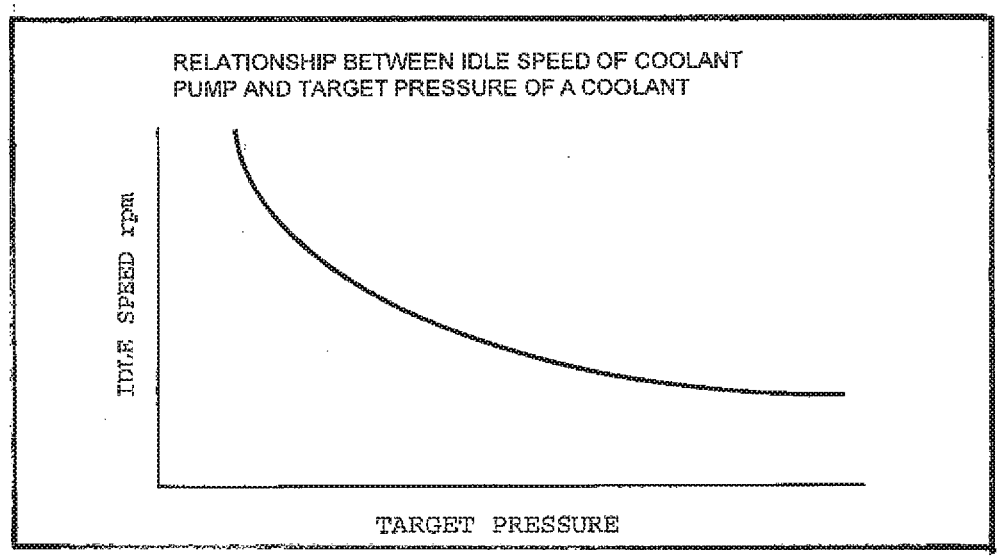
FIG. 8 is a characteristic diagram showing an example of the characteristics of the target pressure and an idle speed.

FIG. 8 is a characteristic diagram illustrating the relationship between the target pressure of a coolant to be supplied (the target discharge pressure of the pump 101) and the idle speed of the coolant pump 101. Here, the "idle speed" means the rotation rate of the coolant pump 101 when the work is not being cut (on the standby for processing).

Incidentally, though not shown in the drawing, a gearbox to change speed or the like is disposed between the motor 1 and the high pressure generating section 2, and the rotation rate of the motor 1 and the rotation rate of the high pressure generating section 2 are sometimes not identical to each other.

The target pressure determination block 50b is connected to the storage device 50m by a signal line Sc2. The rotation rate-flow rate characteristics, the flow rate-drill flow path diameter characteristics, and the drill flow path diameter-target pressure characteristics stored in the storage device 50m are sent to the target pressure determination block 50b.

The target pressure determination block 50b has the function of determining a target pressure of the pump (a target value of the pump discharge pressure) based on the suitably set pump (or electric motor) rotation rate (the "temporary rotation rate" in step S5 in FIG. 3) and the above-described various characteristics.

To the target pressure determination block 50b, a signal line Sc4 is connected. Then, the signal line Sc4 branches off at a branch point Bc2 and is connected to the comparison block 50c and the rotation rate determination block 50h.

The information on the pump target pressure determined in the target pressure determination block 50b is transmitted to the comparison block 50c and the rotation rate determination block 50h via the signal line Sc4.

The comparison block 50c is connected to the pump discharge pressure signal interface 50d by a signal line Sc5, and the pump discharge pressure signal interface 50d is connected to the pump discharge pressure measurement device 22 by the signal line Si2. Moreover, the comparison block 50c is connected to the rotation rate determination block 50h by a signal line line Sc6.

To the comparison block 50c, the measurement result of the discharge pressure of the coolant pump 101 is input from the pump discharge pressure measurement device 22 via the pump discharge pressure signal interface 50d. In addition, the comparison block 50c has the function of comparing the measurement result of the discharge pressure of the coolant pump 101 with the target value of the discharge pressure of the coolant pump 101 to determine an increase or decrease of the rotation rate of the pump 101 or the motor 1 and sending out a control signal (a rotation rate increase-decrease signal) that increases or decreases the rotation rate of the pump 101 or the motor 1 to the rotation rate determination block 50h via the signal line Sc6.

The drilling signal interface 50e is connected to the drill D (the machine tool) via a signal line Ss and has the function of inputting, to the control device 50, a signal (a drilling start signal) that is sent out from the drill D at the start of processing. Incidentally, the signal line Ss is not shown in FIG. 1.

In FIG. 2, to the drilling signal interface 50e, a signal line Sc7 is connected. The signal line Sc7 branches off at a branch point Bc3 and is connected to the rotation rate determination block 50h and the unloading operation control block 50f.

As a result, the drilling start signal that is sent out from the drill D at the start of processing is transmitted to the rotation rate determination block 50h and the unloading operation control block 50f via the drilling signal interface 50e and the signal line Sc7.

The rotation rate determination block 50h is connected to the rotation rate control signal generation block 50j via a signal line Sc8 and is connected to the timer 50t via a line Sc12.

The rotation rate determination block 50h has the function of determining the rotation rate of the pump 101 (or the motor 1) in each stage of control based on the drilling start signal from the drilling signal interface 50e, the information on the temporary rotation rate and the target pressure-idle speed characteristics which are stored in the storage device 50m, the target value of the pump 101 discharge pressure determined in the target pressure determination block 50b, the rotation rate increase-decrease signal from the comparison block 50c, and the timer information from the timer 50t.

The details of the mode in which the rotation rate determination block 50h determines the rotation rate of the pump 101 (or the motor 1) in each stage of control will be described later with reference to FIGS. 3 and 4.

The unloading operation control block 50f is connected to the unloading operation control signal interface 50g via a signal line Sc10. The unloading operation control signal interface 50g is connected to the flow path change-over valve V2 via the control signal line So2.

To the unloading operation control block 50f, the drilling start signal from the drill D is transmitted via the drilling signal interface 50e and the signal line Sc7. In addition, the unloading operation control block 50f has the function of sending out a control signal to the flow path change-over valve V2 via the unloading operation control signal interface 50g, the control signal that switches the flow path change-over valve V2 to the unloading side (a B position in FIG. 1) when the coolant pump 101 has to perform unloading operation (before transmission of the drilling start signal) depending on the presence or absence of the drilling start signal.

The unloading operation control block 50f is connected to the timer 50t by a signal line Sc11.

Here, it is assumed that, when the unloading operation control block 50f sends out an unloading OFF signal and switches the flow path change-over valve V2 to the processing side (the side that delivers the coolant to the drill D) (an "A position" in FIG. 1), the amount of time required for the rotation rate of the pump 101 (or the motor 1) to be stabilized at the temporary rotation rate (for example, 1000 rpm: refer to step S5 in FIG. 3) is about 1 second (refer to step S6 in FIG. 3). This required time is also measured with the timer 50t.

In FIG. 2, the rotation rate control signal generation block 50j has the function of generating a rotation rate control signal for setting the rotation rate of the pump 101 (or the motor 1) of the coolant supply device 500 at the rotation rate determined in the rotation rate determination block 50h.

The rotation rate control signal generation block 50j is connected to the rotation rate control signal interface 50k via a signal line Sc9, and the rotation rate control signal interface 50k is connected to the motor 1 of the coolant supply device 500 via a control signal line So1. As a result, the above-described rotation rate control signal started from the rotation rate control signal generation block 50j is transmitted to the motor 1.

Next, a control which is performed when a coolant is supplied to the drill D of the machine tool will be described based on FIGS. 3 and 4 with reference to FIG. 1, FIG. 2, and FIGS. 5 to 8.

At the start of the control, in steps S1 and S2 in FIG. 3, the flow path change-over valve V2 is switched to the unloading operation (no-load running: in FIG. 1, the "B position") side (unloading ON) to make the coolant supply device 500 perform unloading operation.

At the time of unloading operation, in the flow path change-over valve V2, the line L21 communicates with the line L23 (the "B position" in FIG. 1), and the coolant discharged from the pump 101 is returned to the coolant storage tank 301.

In step S3, the control device 50 determines whether or not to supply the coolant to the drill (drill coolant ON?). The control device 50 determines whether or not to supply the coolant to the drill D depending on whether or not a processing start signal has been input from the drill D side.

If the processing start signal has not been input from the drill D side and the coolant is not supplied to the drill ("NO" in step S3), the flow path change-over valve V2 is set in the "B position" in FIG. 1 to make the coolant supply device 500 continue the unloading operation (a loop in which step S3 is "NO").

On the other hand, if the processing start signal has been input from the drill D side and the coolant is supplied to the drill D ("YES" in step S3), the procedure proceeds to step S4, and the flow path change-over valve V2 is switched to the "A position" in FIG. 1 (a state in which the line L21 communicates with the line L22). Then, the procedure proceeds to step S5.

In step S5, a control signal is sent out to the pump 101 or the motor 1 to set the rotation rate of the pump 101 (or the rotation rate of the motor 1) at the temporary rotation rate (for example, 1000 rpm). Here, setting the pump rotation rate (or the motor rotation rate) at the temporary rotation rate (for example, 1000 rpm) is performed by determining a frequency. Incidentally, the timer 50t begins timing the instant when the pump rotation rate (or the motor rotation rate) is set at the temporary rotation rate (for example, 1000 rpm).

In next step S6, the control device 50 determines whether or not a predetermined time (for example, 1 second) has elapsed after the pump rotation rate was set at the temporary rotation rate (for example, 1000 rpm).

If the predetermined time (for example, 1 second) has not elapsed after the pump rotation rate was set at the temporary rotation rate (for example, 1000 rpm) ("NO" in step S6), the control device 50 waits until the predetermined time (for example, 1 second) elapses (a loop in which step S6 is "NO").

If the predetermined time (for example, 1 second) has elapsed after the pump rotation rate was set at the temporary rotation rate (for example, 1000 rpm) ("YES" in step S6), the procedure proceeds to step S7.

In the stage of step S7 in FIG. 3, the predetermined time (for example, 1 second) has elapsed after the rotation rate of the pump 101 (or the rotation rate of the motor 1) was set at the temporary rotation rate (for example, 1000 rpm) ("YES" in step S6), and the rotation of the pump 101 (or the motor 1) is stabilized.

In step S7, in a state in which the rotation of the pump 101 is stabilized, based on the set rotation rate (the temporary rotation rate in step S5: for example, 1000 rpm) and the discharge pressure of the pump 101 at that point (the pump discharge pressure Pc measured by the pump discharge pressure measurement device 22), by using the rotation rate-pump discharge flow rate characteristics illustrated in FIG. 5, the discharge flow rate of the pump 101 at that point is determined by the target pressure determination block 50b (refer to FIG. 2).

Here, if the pressure is not a value which is a "round" numeric value such as 1 MPa and 2 MPa, the rotation rate-pump discharge flow rate characteristics are determined by prorating the region between the characteristics (which differ from pressure to pressure) in FIG. 5. That is, if the pressure is 1.3 MPa, for example, a characteristic curve that divides the region between the characteristics at a pressure of 1 MPa and the characteristics at a pressure of 2 MPa in FIG. 5 at a ratio of 3:7 is obtained, and, by setting the characteristic curve as the "rotation rate-pump discharge flow rate characteristics at a pressure of 1.3 MPa", the pump discharge flow rate is determined (obtained by a mathematical operation) from the pump rotation rate at that point.

In step S7, after the pump discharge flow rate is determined, the drill flow path diameter (the inside diameter of the coolant flow path formed in the drill D) which is a numeric value on the characteristics in FIG. 6 is determined by the target pressure determination block 50b by using the pump discharge flow rate determined by using FIG. 5 and the flow rate-drill flow path diameter characteristics illustrated in FIG. 6 (the relationship between the pump discharge flow rate and the coolant flow path inside diameter in the drill D) and applying, for example, the pump discharge flow rate determined by using FIG. 5 to the vertical axis shown in FIG. 6.

The flow rate-drill flow path diameter characteristics illustrated in FIG. 6 are transmitted to the target pressure determination block 50b from the storage device 50m. Here, also in the flow rate-drill flow path diameter characteristics illustrated in FIG. 6, if the pressure is not a value which is a "round" numeric value, by prorating the region between the characteristics (which differ from pump discharge pressure to pump discharge pressure) shown in FIG. 6, the flow rate-drill flow path diameter characteristics corresponding to the pump 101 discharge pressure at that point (the pump discharge pressure Pc measured by the pump discharge pressure measurement device 22) are determined. Then, by using the determined flow rate-drill flow path diameter characteristics and the pump discharge flow rate determined by using FIG. 5, the drill flow path diameter (the inside diameter of the coolant flow path formed in the drill D) is determined (obtained by a mathematical operation).

When the drill flow path diameter is determined in step S7, the target value (the target pressure) of the pump discharge pressure is determined by the target pressure determination block 50b by using the drill flow path diameter-target pressure characteristics illustrated in FIG. 7.

The drill flow path diameter-target pressure characteristics illustrated in FIG. 7 are also transmitted to the target pressure determination block 50b from the storage device 50m.

In the target pressure determination block 50b, by applying the drill flow path diameter determined by using FIG. 6 to the drill flow path diameter-target pressure characteristics illustrated in FIG. 7 (applying the drill flow path diameter determined by using FIG. 6 to the horizontal axis shown in FIG. 7), the target value (the target pressure) of the pump discharge pressure which is a numeric value on the characteristic line illustrated in FIG. 7 is determined.

As a result, in step S7 in FIG. 3, the target value (the target pressure) of the pump discharge pressure is determined. Then, the procedure proceeds to step S8.

In step S8 in FIG. 3, an idle speed is determined from the target pressure determined in step S7 by using the characteristics (the target pressure-idle speed characteristics) illustrated in FIG. 8.

The idle speed is determined in the rotation rate determination block 50h (FIG. 2).

To the rotation rate determination block 50h, the target pressure (the target value of the pump discharge pressure determined in step S7) determined in the target pressure determination block 50b is transmitted and the target pressure-idle speed characteristics are transmitted from the storage device 50m. In the rotation rate determination block 50h, by applying the target pressure determined in step S7 to the target pressure-idle speed characteristics (for example, by applying the target pressure determined in step S7 to the horizontal axis in FIG. 8), an idle speed which is a numeric value on the characteristic line illustrated in FIG. 8 is determined.

In step S8, the idle speed of the pump (or the motor) determined in the rotation rate determination block 50h is transmitted to the rotation rate control signal generation block 50j, and, in order to increase or decrease the pump discharge pressure Pc, the rotation rate control signal is transmitted to the motor 1. Then, the procedure proceeds to step S9.

Figure 9:
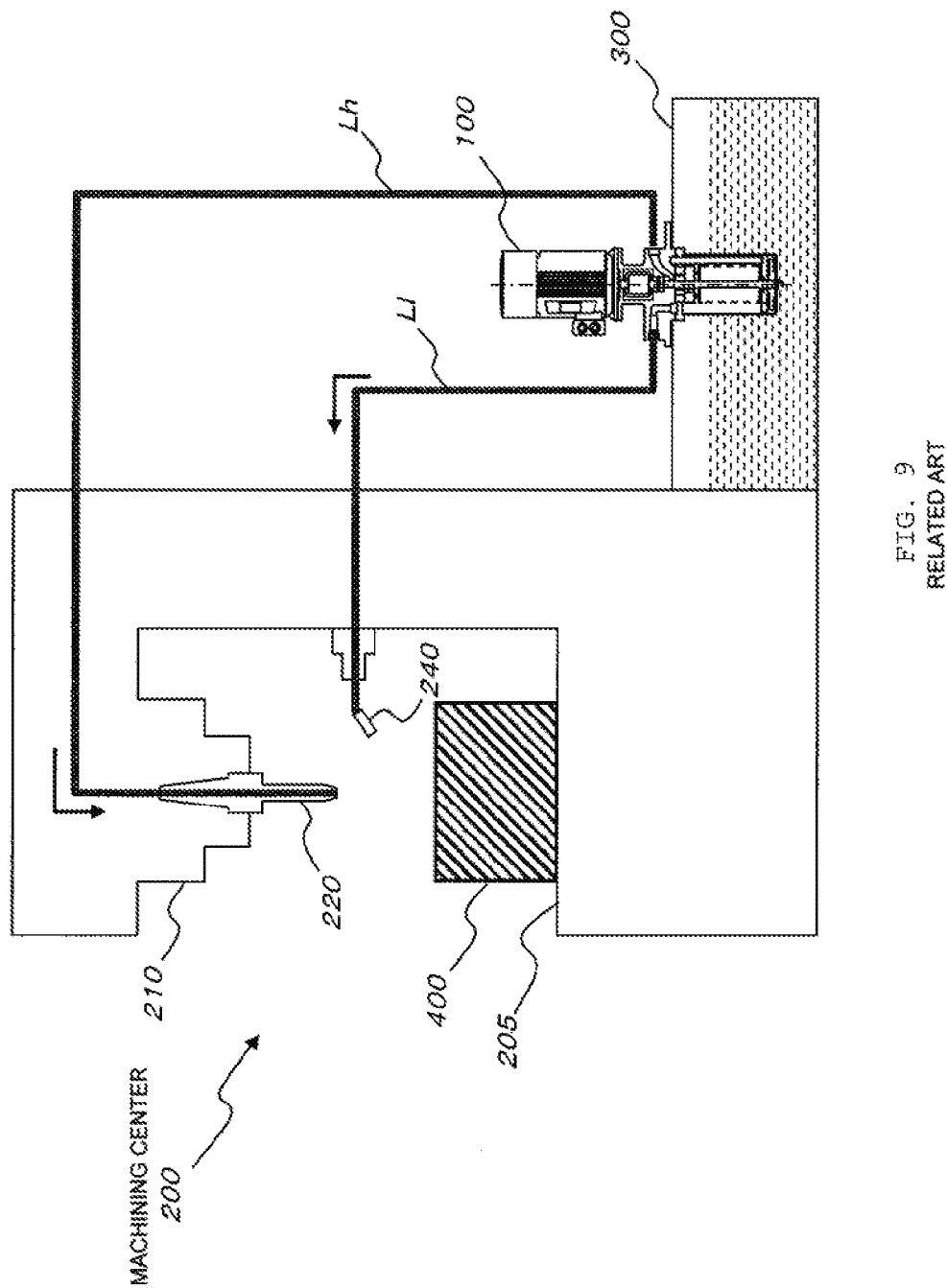
FIG. 9 is a block diagram showing an example of a machining center of the center-through coolant type.

In step S9, an answer back signal to the effect that the preparation of a supply of the coolant is completed in the coolant supply device 500 is sent out to the drill D side for only 0.5 second, for example. At this stage, the processing start signal has been sent out from the drill D side ("YES" in step S3), and it is necessary to supply the coolant to the drill D until the drill D makes contact with the work 400 (refer to FIG. 9: not shown in FIGS. 1 and 2). Therefore, at a stage prior to control performed in step S10 which will be described later, the answer back signal to the effect that the preparation of a supply of the coolant is completed is sent out to the drill D side.

After the answer back signal is sent out to the drill D side, the procedure proceeds to step S10.

Though not clearly shown in FIG. 2, the answer back signal is sent to the drill D from the rotation rate determination block 50$h$ via the drilling signal interface 50$e$ and the signal line Ss when the idle speed is determined in step S8, for example.

In step S10, the control device 50 determines whether or not the drill D has made contact with the work 400. Here, since the coolant discharge pressure of the pump 101 increases when the drill D makes contact with the work, the control device 50 determines whether or not the drill D has made contact with the work based on whether or not the coolant discharge pressure of the pump 101 has increased.

If the coolant discharge pressure of the pump 101 has increased ("YES" in step S10), it is determined that the drill D has moved downward and made contact with the work 400 and boring has been started. Then, the procedure proceeds to step S12 in FIG. 4.

On the other hand, if the coolant discharge pressure of the pump 101 has not increased ("NO" in step S10), it is determined that the drill D has not made contact with the work 400 and boring has not been started, and the procedure proceeds to step S11. In step S11, the control device 50 determines whether or not boring by the drill D is completed and there is no need to supply the coolant to the drill D.

If boring by the drill D is completed and there is no need to supply the coolant to the drill D ("YES" in step S11), the procedure goes back to step S1.

On the other hand, if boring by the drill D is not completed and there is a need to supply the coolant to the drill D ("NO" in step S11), the procedure goes back to step S10.

Figure 4:
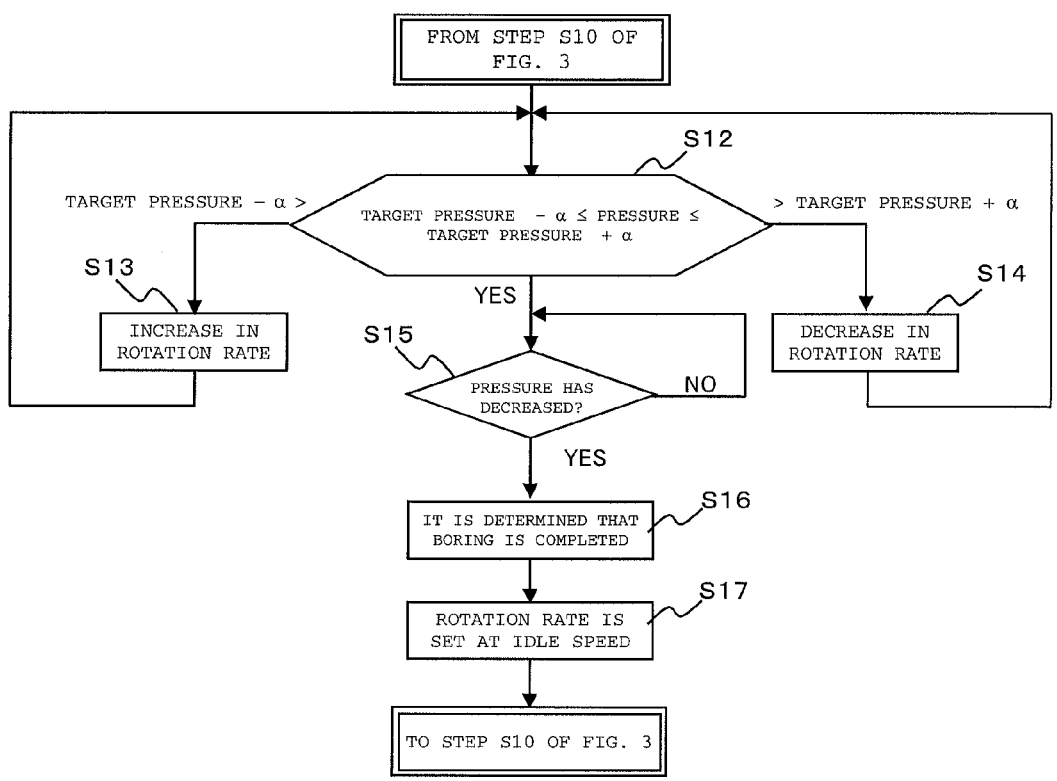
FIG. 4 is a flowchart showing the coolant spraying control in the embodiment.

In step S12 in FIG. 4, the control device 50 determines whether or not the discharge pressure Pc of the pump 101 (the pump discharge pressure measured by the pump discharge pressure measurement device 22) falls within a target pressure range (a tolerance level). Here, the target pressure range (the tolerance level) means that the pressure is within a predetermined range of error $\alpha$ with respect to the target pressure determined in step S8, and the predetermined range of error $\alpha$ is set at 10% of the target pressure, for example.

That is, in step S12, it is determined whether or not "the target pressure$-\alpha \leq$the discharge pressure (Pc)$\leq$the target pressure$+\alpha$".

If the discharge pressure Pc of the pump 101 is lower than the "target pressure$-\alpha$" ("target pressure$-\alpha$>" in step S12), the rotation rate of the pump 101 (or the motor 1) is increased in step S13, and the procedure goes back to step S12.

If the discharge pressure Pc of the pump 101 is higher than the "target pressure $\alpha$" (">target pressure$+\alpha$" in step S12), the rotation rate of the pump 101 (or the motor 1) is decreased in step S14, and the procedure goes back to step S12.

By the control in steps S12 to S14, after the drill D starts boring of the work 400, the discharge pressure Pc of the pump 101 falls within the target pressure range (the target pressure$-\alpha \leq$the discharge pressure Pc$\leq$the target pressure$+\alpha$). Then, when the discharge pressure of the pump has fallen within the target pressure range (the target pressure$-\alpha \leq$the discharge pressure Pc$\leq$the target pressure$+\alpha$) ("YES" in step S12), the procedure proceeds to step S15.

When boring of a through-hole in the work 400 by the drill D is completed, the coolant discharge pressure of the pump 101 decreases suddenly. Therefore, in step S15, it is determined whether or not the discharge pressure of the pump 101 has decreased suddenly and thereby determined whether or not a hole has been bored in the work 400 by the drill D.

If the discharge pressure of the pump has decreased suddenly ("YES" in step S15), it is determined that a drill hole has been bored in the work 400 and boring has been completed (step S16).

Incidentally, in the case of a so-called "blind hole" (a hole which is not penetrated), since the drill D is retracted from a cut area when boring of the work 400 by the drill D is completed, the coolant discharge pressure of the pump 101 decreases suddenly. In other words, in addition to a through-hole, even when a hole bored by the drill D is a so-called "blind hole" (a hole which is not penetrated), when boring of the work 400 by the drill D is completed, the coolant discharge pressure Pc of the pump 101 decreases suddenly.

In the control shown in the drawing, in steps S12 to S14, if the discharge pressure Pc of the pump 101 reaches the target pressure range (the target pressure$-\alpha \leq$the discharge pressure Pc$\leq$the target pressure$+\alpha$) ("YES" in step S12), even when the discharge pressure of the pump deviates from the target pressure range after that, it is ignored unless the discharge pressure decreases suddenly (a loop in which step S15 is "NO").

During boring by the drill D, as the drill hole bored in the work 400 is deepened, the coolant discharge pressure of the pump 101 increases. However, to prevent "hunting" in the control, such fluctuations in the pump discharge pressure are ignored.

If the coolant discharge pressure of the pump 101 has decreased suddenly ("YES" in step S15) and it is determined that boring of a drill hole in the work 400 has been completed (step S16), the rotation rate of the pump 101 is set at the idle speed (step S17). This is performed to spray a necessary and sufficient amount of coolant in order to prevent an area around the drill hole of the work 400 from being damaged when the drill D is pulled out of the work 400.

Moreover, after the completion of boring by the drill D, if the rotation rate of the pump 101 is the same as the rotation rate at the time of boring, excess coolant is sprayed. On the other hand, by decreasing the rotation rate of the pump 101 to the idle speed after boring, it is possible to reduce the quantity of coolant to be sprayed.

After the rotation rate of the pump 101 is set at the idle speed (step S17), the procedure goes back to step S10 in FIG. 3.

According to the embodiment shown in the drawings, the target value (the target pressure) of the coolant discharge pressure of the pump 101 and the measurement result obtained by the pump discharge pressure measurement device 22 are compared with each other, and the rotation rate of the pump 101 or the rotation rate of the electric motor 1 is increased or decreased. That is, in the embodiment shown in the drawings, only the discharge pressure of the high-pressure pump 2 is a control parameter, and there is no need to perform feedback control of the rotation rate of the pump 101 (the high-pressure pump 2) or the electric motor 1.

Moreover, in the embodiment shown in the drawings, the rotation rate of the pump 101 (the high-pressure pump 2) or the electric motor 1 is increased or decreased, but such control is not rotation rate feedback control. This control is performed to increase or decrease the discharge pressure of the pump 101.

According to the embodiment shown in the drawings, there is no need to perform complicated rotation rate feedback control (of the pump 101 or the electric motor 1), and it is possible to supply a coolant appropriately to the center-through coolant drill D by controlling only the discharge pressure of the pump 101.

As is obvious to the skilled in the art, it is very difficult to determine, on the pump 101 side, a target pressure automatically in response to a coolant flow path diameter when the coolant flow path diameter in the drill D of the center-through coolant type is determined. This is because there are an infinite number of combinations of the drill D and the pump 101 and the coolant flow path diameter of the drill in the drill D also varies widely.

According to the embodiment shown in the drawings, it is possible to determine the inside diameter size (the flow path diameter) of the coolant flow path of the drill and an optimum pump discharge pressure (target pressure) for the coolant flow path diameter on the pump 101 side without inputting, to the pump 101 side, information from the center-through coolant drill D, for example, information on the coolant flow path diameter of the drill in the set drill D. Therefore, even when there are an infinite number of combinations of the drill D and the pump 101 and there are a wide variety of coolant flow path diameters in the drill, it is possible to determine an optimum discharge pressure of the coolant and perform boring by the drill appropriately.

The embodiment shown in the drawings is merely an example and is not intended to limit the technical scope of the present invention.

For example, the characteristic diagrams shown in FIGS. 5 to 7 differ on a case-by-case basis. Moreover, the temporary rotation rate (in the embodiment shown in the drawings, 1000 rpm), the standby time for stabilization of the rotation rate (refer to step S6), the allowable error α (10% of the target value) for the target value of the pump discharge pressure, and so forth can also be changed on a case-by-case basis.

Moreover, in the embodiment shown in the drawings, the drill D is described as a tool to which a coolant is supplied, but the present invention can also be applied to a case in which the coolant is supplied to other tools.

EXPLANATIONS OF LETTERS OR NUMERALS

1 . . . electric motor
2 . . . high pressure generating section/high-pressure pump
3 . . . suction pressure generating section/low-pressure pump
4 . . . cyclone for removal of foreign body
5 . . . pump drive shaft
6 . . . rotation rate measurement device
7 . . . visual identification pressure gauge
20 . . . line filter
22 . . . pump discharge pressure measurement device/discharge pressure gauge
26 . . . chip collecting device
50 . . . control device/control unit
301 . . . coolant storage tank
D . . . drill
V1 . . . safety valve
V2 . . . flow path change-over valve
V3 . . . check valve

The invention claimed is:

1. A coolant supply device comprising:
a pump that supplies a coolant to a tool;
a measurement device that measures a discharge pressure of the pump; and
a control device,
wherein
the control device has a function for determining a pump discharge flow rate by a rotation rate of the pump and a pump discharge pressure measured by a pump discharge pressure measurement device,
a function for determining a coolant flow path diameter of the tool by the determined pump discharge flow rate,
a function for determining a target value of a pump discharge pressure at a time of boring performed by the tool, by the determined coolant flow path diameter of the tool,
a function for increasing or decreasing the rotation rate of the pump by comparing the target value of the determined pump discharge pressure with a measurement value measured by a pump discharge pressure measurement device, and
a function for determining whether or not boring by the tool is completed, based on the measured pump discharge pressure, wherein the control device has a function for determining a coolant flow path diameter of the tool and a target value of a pump discharge pressure at a time of boring performed by the tool, after no-load running of the tool is completed, at a stage prior to boring performed on a work by the tool.

2. A method for supplying a coolant to a tool by a coolant supply device provided with a pump, a measurement device which measures a discharge pressure of the pump, and a control device, comprising steps of:
measuring a pump discharge pressure;
determining a pump discharge flow rate by a rotation rate of the pump and a pump discharge pressure measured by a pump discharge pressure measurement device,
determining a coolant flow path diameter of the tool by the determined pump discharge flow rate,
determining a target value of a pump discharge pressure at a time of boring performed by the tool, by the determined coolant flow path diameter of the tool,
performing at least one selected from among increasing or decreasing the rotation rate of the pump by comparing the target value of the determined pump discharge pressure with a measurement value of the pump discharge pressure, and
determining whether boring by the tool is completed, based on the measured pump discharge pressure, wherein said step for determining a coolant flow path diameter of the tool and said step for determining the target value of a pump discharge pressure at a time of boring performed by the tool are performed after no-load running of the tool is completed, at a stage prior to boring performed on a work by the tool.

* * * * *